United States Patent
Levandowski et al.

(10) Patent No.: US 9,092,977 B1
(45) Date of Patent: Jul. 28, 2015

(54) LEVERAGING OF BEHAVIOR OF VEHICLES TO DETECT LIKELY PRESENCE OF AN EMERGENCY VEHICLE

(71) Applicant: Google Inc., Mountain View, CA (US)

(72) Inventors: Anthony Scott Levandowski, Berkeley, CA (US); Brian Cullinane, Palo Alto, CA (US)

(73) Assignee: Google Inc., Mountain View, CA (US)

(*) Notice: Subject to any disclaimer, the term of this patent is extended or adjusted under 35 U.S.C. 154(b) by 0 days.

(21) Appl. No.: 14/467,479

(22) Filed: Aug. 25, 2014

Related U.S. Application Data

(63) Continuation of application No. 13/678,072, filed on Nov. 15, 2012, now Pat. No. 8,849,557.

(51) Int. Cl.
*G06F 17/00* (2006.01)
*G08G 1/01* (2006.01)

(52) U.S. Cl.
CPC .................................. *G08G 1/01* (2013.01)

(58) Field of Classification Search
USPC ......... 701/1, 23–25, 117, 400, 409, 410, 420, 701/422, 300, 301
See application file for complete search history.

(56) References Cited

U.S. PATENT DOCUMENTS

| | | | |
|---|---|---|---|
| 4,626,850 A | 12/1986 | Chey | |
| 5,610,815 A | 3/1997 | Gudat et al. | |
| 6,055,042 A | 4/2000 | Sarangapani | |
| 6,404,351 B1 | 6/2002 | Beinke | |
| 6,822,580 B2 | 11/2004 | Ewing et al. | |
| 7,057,528 B1 | 6/2006 | Ewing et al. | |
| 7,205,888 B2 | 4/2007 | Isaji et al. | |
| 7,295,925 B2 | 11/2007 | Breed et al. | |
| 7,979,172 B2 | 7/2011 | Breed | |
| 7,979,173 B2 | 7/2011 | Breed | |
| 8,005,609 B2 | 8/2011 | Uyeki et al. | |
| 8,108,138 B2 | 1/2012 | Bruce et al. | |
| 8,346,480 B2 | 1/2013 | Trepagnier et al. | |
| 8,493,198 B1 | 7/2013 | Vasquez et al. | |
| 8,712,624 B1 | 4/2014 | Ferguson et al. | |
| 2004/0061600 A1* | 4/2004 | Wehner et al. ................. 340/435 |
| 2005/0065711 A1 | 3/2005 | Dahlgren et al. | |
| 2007/0027583 A1 | 2/2007 | Tamir et al. | |
| 2007/0159354 A1 | 7/2007 | Rosenberg | |
| 2008/0161987 A1 | 7/2008 | Breed | |
| 2009/0299573 A1 | 12/2009 | Thrun et al. | |
| 2010/0063664 A1 | 3/2010 | Anderson | |
| 2010/0063672 A1 | 3/2010 | Anderson | |
| 2010/0169009 A1 | 7/2010 | Breed et al. | |
| 2010/0228482 A1 | 9/2010 | Yonak | |

(Continued)

OTHER PUBLICATIONS

Dave Ferguson, Christopher Baker, Maxim Likhachev, and John Dolan, A Reasoning Framework for Autonomous Urban Driving, 2008.

*Primary Examiner* — Kim T Nguyen
(74) *Attorney, Agent, or Firm* — Lerner, David, Littenberg, Krumholz & Mentlik, LLP

(57) ABSTRACT

A controlled vehicle is provided that detects the presence of an emergency vehicle by monitoring the trajectories of vehicles that are sharing the road with the controlled vehicle. The controlled vehicle may determine that the trajectory of each of the monitored vehicles follows the same predetermined pattern. Based on detecting the predetermined pattern in the behavior of the monitored vehicles, the controlled vehicle may deduce that an emergency vehicle is present in the vicinity of the monitored vehicles and/or the controlled vehicle.

20 Claims, 9 Drawing Sheets

(56) References Cited

U.S. PATENT DOCUMENTS

| | | |
|---|---|---|
| 2010/0280751 A1 | 11/2010 | Breed |
| 2011/0125405 A1 | 5/2011 | Blesener et al. |
| 2012/0072051 A1 | 3/2012 | Koon et al. |
| 2012/0078572 A1 | 3/2012 | Bando et al. |
| 2012/0083960 A1 | 4/2012 | Zhu et al. |
| 2012/0109423 A1 | 5/2012 | Pack et al. |
| 2012/0271542 A1 | 10/2012 | Arcot et al. |
| 2012/0277932 A1 | 11/2012 | Anderson |
| 2013/0147638 A1 | 6/2013 | Ricci |
| 2013/0282271 A1 | 10/2013 | Rubin et al. |
| 2014/0062724 A1* | 3/2014 | Varoglu et al. ............ 340/902 |

* cited by examiner

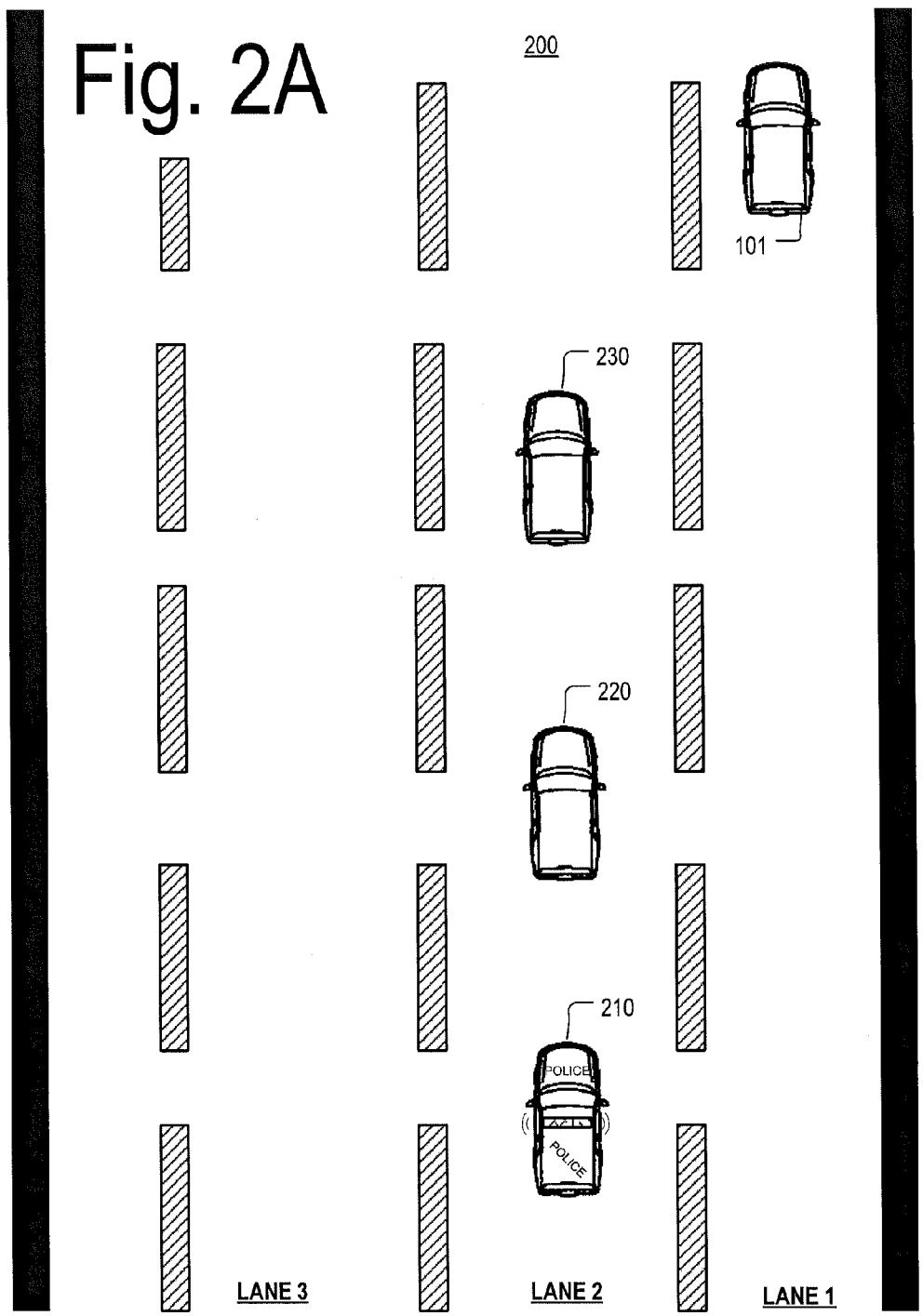

LEVERAGING OF BEHAVIOR OF VEHICLES TO DETECT LIKELY PRESENCE OF AN EMERGENCY VEHICLE

CROSS-REFERENCE TO RELATED APPLICATIONS

The present application is a continuation of U.S. patent application Ser. No. 13/678,072, filed Nov. 15, 2012, the disclosure of which is incorporated herein by reference.

BACKGROUND

Smart vehicles rely on computing systems to aid in the transport of passengers. The computing systems may control the operation of various vehicle systems, such as braking, steering, and acceleration systems, and they may be used to guide the autonomous vehicles from one location to another. Autonomous vehicles use various computing systems to select the fastest route to their travel destination, avoid obstacles, and otherwise operate in a safe and dependable manner.

SUMMARY

In one aspect, a method is provided that includes identifying a first vehicle that is travelling on a same road as a controlled vehicle and identifying a second vehicle that is travelling on the same road as the controlled vehicle. The method further includes tracking the first vehicle to determine a first trajectory of the first vehicle and tracking the second vehicle to determine a second trajectory of the second vehicle. The method further includes comparing, by a processor, the first trajectory to the second trajectory to determine whether the first trajectory and the second trajectory match, wherein two trajectories match when both have a similar shape, determining, based on a match between the first trajectory and the second trajectory, that an emergency vehicle is present on the road, and changing a state of a vehicle system of the controlled vehicle in response to determining that the emergency vehicle is present on the road. In some instances, the first vehicle and the second vehicle may further be part of traffic that is oncoming to the first vehicle. In other instances, the first vehicle and the second vehicle may further be located behind the controlled vehicle.

Comparing the first trajectory to the second trajectory may further include determining, based on the first trajectory, that the first vehicle changed lanes at a first time instant, determining, based on the second trajectory, that the second vehicle changed lanes at a second time instant, determining a time difference between the first time instant and the second time instant, and determining that the first trajectory matches the second trajectory based on the time difference being less than a predetermined threshold. As another example, comparing the first trajectory to the second trajectory may further include determining a similarity between a shape of the first trajectory and the shape of the second trajectory.

Comparing the first trajectory to the second trajectory may further include determining, based on the first trajectory, that the first vehicle left a first lane on the road at a first time instant, determining, based on the second trajectory, that the second vehicle left the first lane at a second time instant, determining a duration of a time interval between the first time instant and the second time instant, and determining that the first trajectory matches the second trajectory based on the duration of the time interval being less than a predetermined threshold. In some instances, the predetermined threshold may be determined based on a distance between the first vehicle and the second vehicle.

In yet another aspect, a method is provided that includes identifying a first vehicle that is travelling on a same road as the controlled vehicle, identifying a second vehicle that is travelling on the same road as the controlled vehicle, identifying a first set of one or more actions performed by the first vehicle, identifying a second set of one or more actions performed by the second vehicle, comparing, by a processor, the first set to the second set to determine whether the first set and the second set match, determining, based on a match between the first set and the second set, wherein two sets match when both include similar actions, that an emergency vehicle is present on the road, and changing a state of a vehicle system of the controlled vehicle in response to determining that the emergency vehicle is present on the road.

The actions performed by the first vehicle may include one or more of stopping, accelerating, decelerating, changing lanes, and activating a blinker. The first set may further include a first action and a second action and the second set may further include a third action and a fourth action. The method may further include determining that the first set matches the second set based on the first action and the second action having been performed in the same relative order as the third action and the fourth action. The method may further include, determining that the first vehicle performed a first action, determining that the second vehicle performed a second action that is of the same type as the first action, and determining that the first set matches that second set based on the first action being of the same type as the second action.

The method may further include determining that the first vehicle performed a first action at a first time instant, determining that the second vehicle performed a second action at a second time instant, and determining that the first set matches the second set based on the duration of a time interval between the first time instant and the second time instant being less than a threshold. In one instance, the method may further include determining the threshold based on a distance between the first vehicle and the second vehicle. In another instance, the method may further include determining the threshold based on at least one of a speed of the first vehicle and speed of the second vehicle. The first action may further be of the same type as the second action.

The method may further include determining a first distance between the first vehicle and the controlled vehicle, determining a second distance between the second vehicle and the controlled vehicle, and determining a third distance between a third vehicle and the controlled vehicle. The method may further include identifying a first action performed by the first vehicle, identifying a second action performed by the second vehicle, and identifying a third action performed by the third vehicle. The method may further include determining that the first set matches the second set based on the first action, the second action, and the third action being performed in an order that corresponds to the relative lengths of the first, second, and third distances.

In yet another aspect, a method is provided that includes identifying a plurality of vehicles that share a road with a controlled vehicle, monitoring actions performed by each one of the plurality of vehicles, and identifying a similarity in the actions performed by each one of the plurality of vehicles, determining, by a processor, based on the similarity being identified, that an emergency vehicle is present on the road, and changing a state of a vehicle system of the controlled vehicle in response to determining that the emergency vehicle is present on the road.

The monitored vehicles may further be located behind the controlled vehicle. In other instances, the controlled vehicle may be travelling in a first direction, and the monitored vehicles may be travelling in a direction opposite to the first direction. In yet other instances, the monitored vehicles may be located in front of the controlled vehicle. In another example, the method also includes receiving data from a microphone and determining, by the processor, that an emergency vehicle is present on the road is further based on the received data from the microphone.

BRIEF DESCRIPTION OF THE DRAWINGS

FIG. 2A depicts a schematic diagram of the vehicle of FIG. 1 in operation.

DETAILED DESCRIPTION

Figure 1:
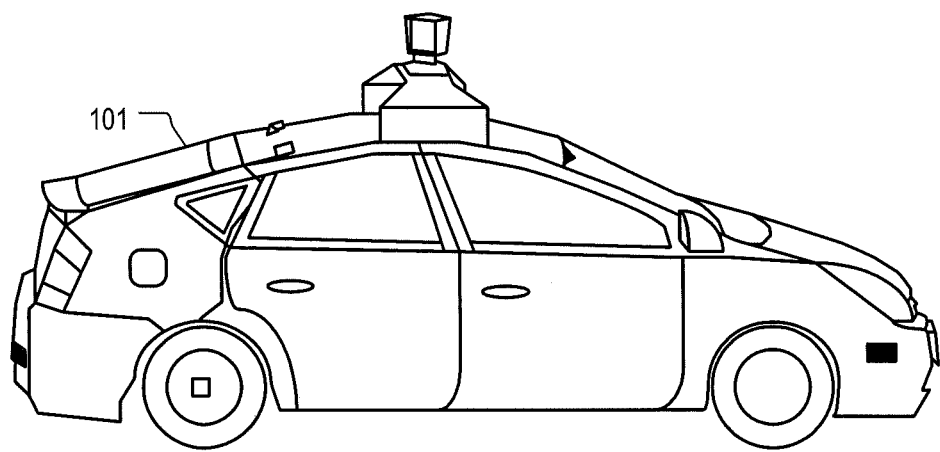
FIG. 1 depicts a side view of a controlled vehicle in accordance with aspects of the disclosure.

In one aspect, a controlled vehicle is provided that detects the presence of an emergency vehicle by monitoring the behavior of vehicles that are sharing the road with the controlled vehicle. The emergency vehicle may be a police car, fire truck, an ambulance, or any other type of emergency vehicle. The controlled vehicle may maintain a 360° view of its surroundings and track the movements of the monitored vehicles. The tracking may be performed by using a camera, laser scanner, or another similar device. As a result of the tracking, the controlled vehicle may determine that the behavior of each of the monitored vehicles follows the same predetermined pattern. The controlled vehicle may use the detection of such predetermined patterns are detected to deduce that an emergency vehicle is present in its vicinity.

For example, it may be determined that monitored vehicles located behind the controlled vehicle are moving to the road's shoulder in a sequence, with the monitored vehicle that is the furthest away from the controlled vehicle starting first, and the next furthest vehicle going second, and the second next furthest vehicle going third, etc. Such a pattern may be the result of an emergency vehicle approaching from behind the controlled vehicle thereby causing the monitored vehicles to move into the road's shoulder in the order in which they are reached by the emergency vehicle. Upon detecting this pattern, the controlled vehicle may deduce that an emergency vehicle is present in the vicinity of the controlled vehicle and may take a responsive action, as necessary. The action may include, for example, pulling over, changing lanes, or any other action that is deemed desirable.

In one aspect, the presence of the emergency vehicle may be detected by observing the behavior of vehicles travelling behind the controlled vehicle. For example, a predetermined number of vehicles may be identified that are travelling behind the controlled vehicle. The trajectories of the vehicles may be monitored and similarities in their trajectories may be identified. The trajectory of each vehicle may include a plurality of locations travelled by the vehicle. In order for two trajectories to be considered similar, they should to be composed of similar locations or have similar shapes. When the trajectories of a predetermined number of vehicles match, this may be taken as an indication that an emergency vehicle is present on the road.

In another aspect, the presence of an emergency vehicle may be detected based on a number of monitored vehicles performing the same or a similar action. The action may be changing lanes, pulling over, slowing down, speeding up, braking, switching a blinker on, etc. Two actions may be considered similar if they happen in close temporal proximity and/or if they have similar direction (e.g., vehicles moving from the left lane to the right lane, etc.).

Moreover, in yet another aspect, the presence of the emergency vehicle may be detected based on the order in which similar actions are performed by the monitored vehicles. As discussed above, when a predetermined number of vehicles perform similar actions (in a predetermined order), this may be an indication that an emergency vehicle is present on the road.

In yet another aspect, the emergency vehicle may be detected using an array of sensors, such as cameras, microphones, or laser scanners. For example, image recognition techniques may be employed to distinguish emergency vehicles, such as police cars, fire trucks, or ambulances, from other vehicles on the road. Alternatively, microphones can be used to detect emergency vehicles' sirens. For example, the microphone may be used to record and identify sounds at frequencies and patterns known to be used by emergency vehicles. As yet another alternative, a laser scanner may be used to obtain 3D representations of vehicles on the road and those representations may then be compared to known representations of emergency vehicles.

FIG. 1 is a schematic diagram of controlled vehicle 101 in accordance with one aspect of the disclosure. Controlled vehicle 101 may be an autonomous or semi-autonomous vehicle capable of driving form one point to another without (or with partial) user input. Although in this example controlled vehicle 101 is an automobile, in various other examples controlled vehicle 101 may be any type of vehicle adapted to carry one or more people, such as a truck, motorcycle, bus, boat, airplane, helicopter, lawnmower, recreational vehicle, amusement park vehicle, farm equipment, construction equipment, tram, golf cart, trains, or trolley.

FIG. 2A depicts an example of the operation of the controlled vehicle 101 in accordance with one aspect of the disclosure. In this example, controlled vehicle 101 is traveling on a road 200 together with other vehicles. As it travels down the road, the vehicle 101 selects vehicles 220 and 230 for monitoring. Each of the vehicles 220-230 may be selected based on a number of criteria. In one aspect the vehicles may be selected based on being within a threshold distance from controlled vehicle 101. In another aspect, the vehicles may be selected based on being within the range of a sensor (e.g., camera or laser scanner) on the vehicle 101.

After vehicles 220 and 230 are selected, controlled vehicle 101 may observe and record their trajectories. The trajectories may be observed and recorded in a number of ways. In one example, controlled vehicle 101 may use a laser scanner and image processing software to track the vehicles 220-230. In another example, curbside sensors may be used on the side of the road 430 to detect passing vehicles. In yet another aspect, the vehicles 220-230 may themselves transmit their geo-location to the controlled vehicle 101. In other words, the controlled vehicle 101 is not limited to any particular technique for tracking other vehicle's trajectories.

Moreover, in some instances, the controlled vehicle 101 may monitor vehicles that are located in a specific portion of the road 200. For example, the controlled vehicle 101 may track only vehicles that are located behind the vehicle 101. This may help identify emergency vehicles that are approaching the vehicle 101 from behind.

As another example, the vehicle 101 may monitor only vehicles that are part of oncoming traffic. Tracking such vehicles, may help identify emergency-vehicles that are driving towards the front of the vehicle 101. In any event, by monitoring vehicles located only in a specific portion of the road 200, the controlled vehicle may save computational resources while focusing or resolving a specific problem associated with the detection of emergency vehicles, such as detecting emergency vehicles that are approaching the controlled vehicle 101 from behind or detecting emergency vehicles that are part of oncoming traffic.

In the example of FIG. 2A, an emergency vehicle 210 approaches the vehicles 220 and 230 from behind and causes them to change lanes, for example, in order to allow the emergency vehicle to pass safely. The controlled vehicle 101, as noted, may monitor the trajectories of the vehicles 220 and 230 and detect when the vehicles change lanes during a short time interval. Based on this, the controlled vehicle may infer that both vehicles have been prompted by a likely emergency vehicle approach. After the controlled vehicle 101 has determined the presence of an emergency vehicle in its vicinity, the controlled vehicle may slow down, pull over in the shoulder of the road, or perform any other that is desirably performed by drivers when emergency vehicles are present on the road.

Figure 2B:
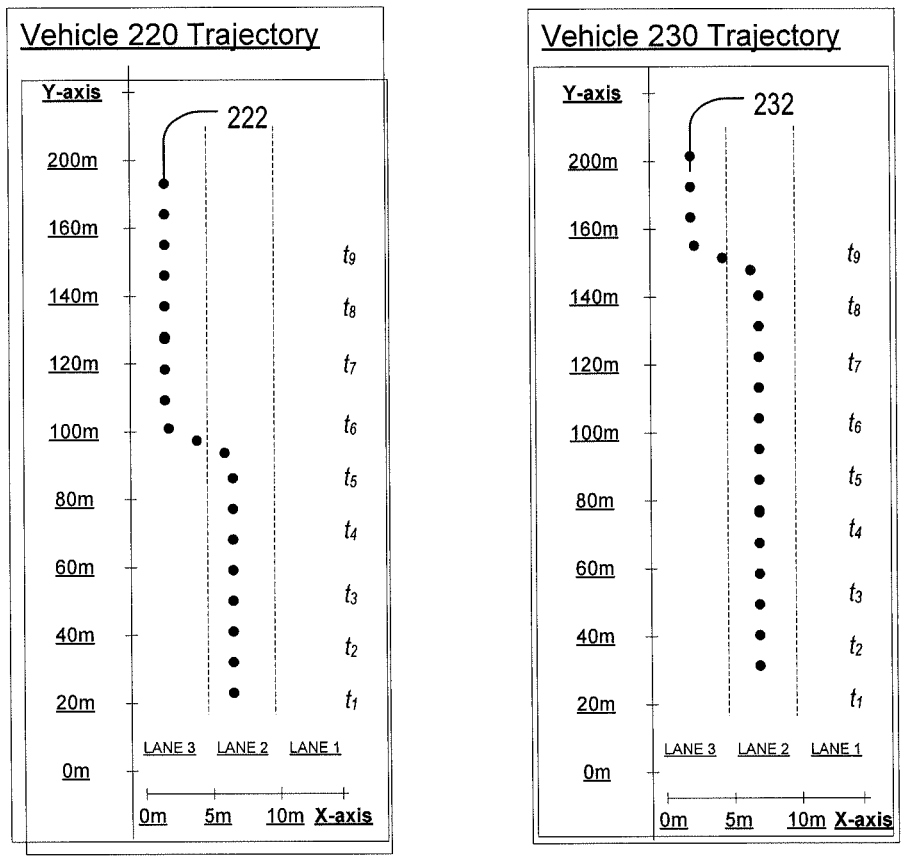
FIG. 2B depicts schematic diagrams of trajectories travelled by vehicles that share a road with the controlled vehicle of FIG. 1.

FIG. 2B depict plots of trajectories of vehicles 220 and 230 observed by the controlled vehicle 101. Trajectory 222 of the vehicle 220 is depicted as a collection of solid dots. Each solid dot represents a location passed by the vehicle 220. A location may be considered passed by the vehicle 220 if the vehicle 220 either drives over or through that location or within a predetermined distance from that location (e.g., 1 meter). Together all dots in the plot trace out a path traveled by the vehicle 220. In a similar fashion, trajectory 232 indicates the path traveled by the vehicle 230. The trajectory 222 indicates that the vehicle 220 changed lanes when it reached $90^{th}$ meter of road 200 at time $t_5$. The trajectory 222 indicates that the vehicle 220 changed lanes when it reached $150^{th}$ meter of road 200 at time $t_8$. In this example, the vehicles 220 and 230 change lanes in the order in which they are reached by the vehicle 210.

As noted, similarities in the behavior of the vehicles 220 and 230 may be used to discern the presence of an emergency vehicle on the road 200. Thus, in one aspect, may the vehicle 101 compare the actions performed by vehicles in its vicinity, such as the vehicles 220 and 230, and if the vehicle 101 determines that the other vehicles are performing the same action (e.g., pulling over on the side of the road to let an emergency vehicle pass), the vehicle 101 may determine that an emergency vehicle is also present on the road 200. However, in order for this approach to be effective, the actions that are compared should have taken place during a predetermined time interval. The greater the delay between two actions, the lower the likelihood that they are caused by the same stimulus (e.g., the passing of an emergency vehicle). Thus, in order for the vehicle 101 to detect the presence of an emergency vehicle on the road 200 by comparing actions performed by other vehicles on the road, the compared actions should not be too far removed in time from one another.

As illustrated in FIG. 2, the vehicle 220 changes lanes at roughly time=$t_5$ and the vehicle 230 changes lanes at time=$t_8$. The greater the period $t_5$-$t_8$ the greater the likelihood of the vehicles 220 and 230 having changed lanes for unrelated causes. In that regard, in some instances, the performance of a specific action by two or more vehicles that share the road 200 with the controlled vehicle 101 may be indicative of an emergency vehicle being present in the vicinity of the controlled vehicle 101 only when the time period during which the action is performed by all vehicles (e.g., the time period $t_5$-$t_8$) is less than a predetermined threshold. In instances where the behavior of larger group of vehicles is monitored and used to discern the presence of an emergency vehicle, the time period during which all compared actions have to be performed may span between the earliest time an action that is being compared is performed by one of the monitored vehicles to the latest time at which another action that is being compared is performed by another one of the vehicles.

In some instances, the threshold may be calculated dynamically by the controlled vehicle 101. As noted above, having some delay between the vehicles 220 and 230 changing lanes may be normal because of some distance existing between the two vehicles. Furthermore, as noted above, vehicles may change lanes in the order they are reached by an emergency vehicle coming from behind. Thus, the greater the distance between two vehicles, the greater the delay between their changing of lanes. In that regard, basing the threshold on the distance between the vehicles 220 and 230 may help determine what constitutes a reasonable delay between actions performed by the vehicles 220 and 230 in response to the emergency vehicle 101 approaching. Thus in some instances, the threshold may be calculated by the vehicle 101 based on at least one of a distance between the vehicles 220 and 230. The distance between the vehicles (or the vehicle's speeds) may be determined by using a laser scanner or another similar device.

Moreover, in some instances, the order in which an action is performed by two or more vehicles that share the road with the controlled vehicle 101 may be relevant with respect to determining whether an emergency vehicle is present in the vicinity of the controlled vehicle 101. In general, the vehicles 220 and 230 may be expected to change lanes in the order in which they are reached by an emergency vehicle. In that regard, the vehicle that is further behind the controlled vehicle 101 (e.g. the vehicle 220) may be expected to change lanes first. Thus for example, if the vehicle 220 changes lanes before the vehicle 230, this may be considered to indicate the presence of an emergency vehicle. However, if the vehicle 230 changes lanes first, this action, under some circumstances, may not be considered indicative of an emergency vehicle being present in the vicinity of vehicle 230.

Figure 3:
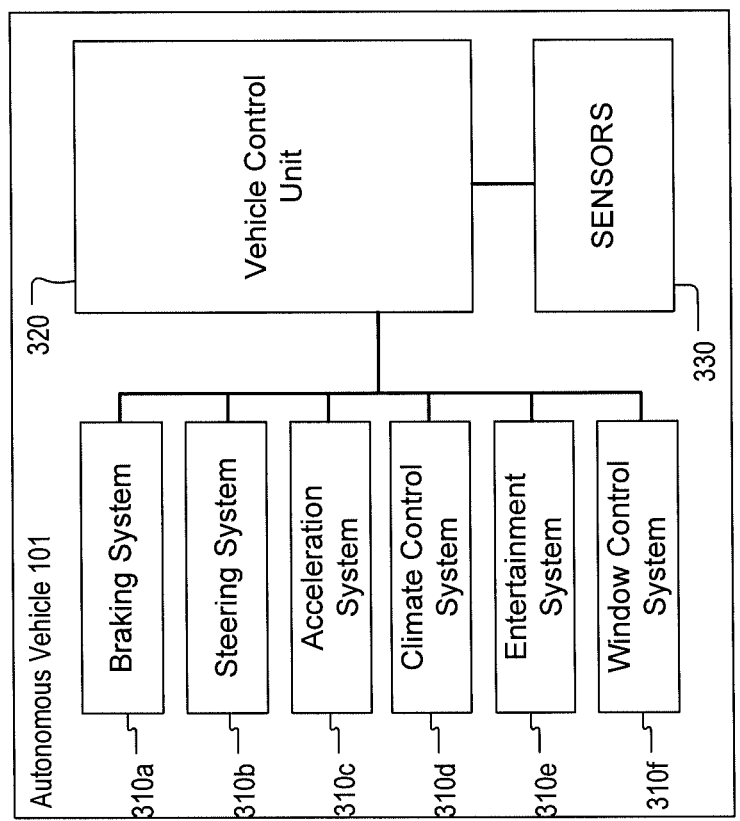
FIG. 3 depicts a schematic diagram of the controlled vehicle of FIG. 1.

FIG. 3 depicts a schematic diagram of the controlled vehicle 101 in accordance with aspects of the disclosure. As illustrated, controlled vehicle 101 includes vehicle systems 310a-f, a vehicle control unit 320, and sensors 330. The vehicle systems 310a-f may include a braking system 310a, a steering system 310b, an acceleration system 310c, a climate control system 310d, an entertainment system 310e, and a navigation system 310f. The above systems are provided only as an example and thus the vehicle systems 310a-f may include any type system that is capable of performing one or more functions that are normally associated with vehicles, such as braking, steering, playing the radio, rolling down the windows, turning on an air-conditioner, etc. Although the vehicle systems 310a-f are depicted as separate blocks, in some instances they may share components (e.g., computer hardware, mechanical hardware, software, etc.) or they may be fully integrated with one another.

In one example, a vehicle system may include one or more of a mechanical hardware components that are part of the vehicle (e.g., rack and pinion, engine, brakes, steering motor, suspension, steering pump, etc.) and/or software that is executed by computer hardware and used to control aspects of the operation of the mechanical hardware components. In another example, a vehicle system may include one or more electronic components that are part of the controlled vehicle 101 (e.g., light bulb, music player, radio, air conditioner, windshield wiper motor, steering pump, etc.), and/or software that is executed by computer hardware and used to control aspects of the operation of the electric or electronic components. Furthermore, in yet another example, vehicle systems may include logic implemented in hardware (e.g. an FPGA or another controller) instead of software for controlling aspects of the operation of mechanical or electric vehicle components.

The vehicle control unit 320 may include a computing system for controlling at least some aspects of the operation of the controlled vehicle 101. Vehicle control unit 320 may also be operatively connected to one or more of the vehicle systems 310a-f and it may be operable to change the state of any one of these systems. For example, the vehicle control unit 320 may interact with the braking system, steering system, and acceleration system, to steer, slow down, or accelerate the vehicle. Furthermore, as another example, the vehicle control unit 320 may interact with: the climate control system to change the temperature inside the passenger compartment 210, the entertainment system 310e to change the station playing on the radio, or the vehicle navigation system 310f to change a destination the vehicle is travelling to.

Sensors 330 may include one or more sensors, such as a camera, a microphone, a laser scanner, a radar, or another similar sensor. Information provided by the sensors 330 may be processed by the vehicle control unit 320 and used to identify one or more vehicles that share the road with the controlled vehicle 101 as emergency vehicles. In some instances, the sensors may be configured to monitor a portion of the road on which the controlled vehicle 101 travelling. For example, they may be configured to monitor only the portion of the road that is behind the controlled vehicle 101 or the portion of the road that is ahead of the controlled vehicle 101.

Figure 4:
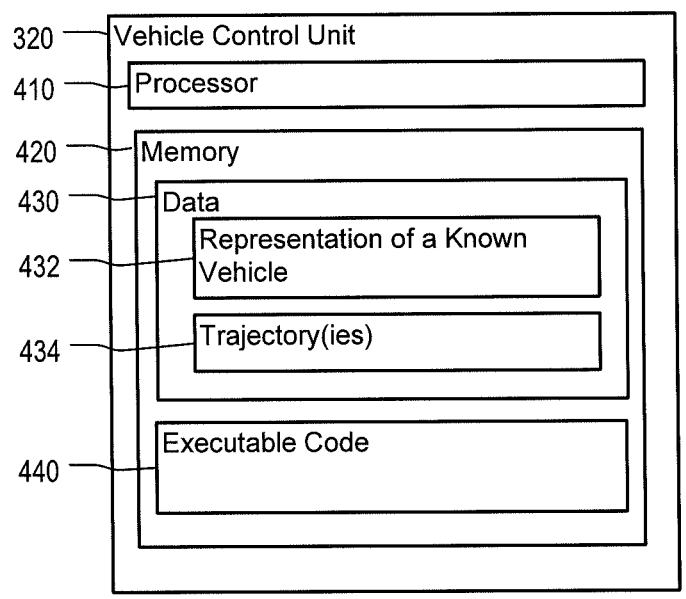
FIG. 4 depicts a schematic diagram of a vehicle control unit of the controlled vehicle of FIG. 1.

FIG. 4 depicts a schematic diagram of the vehicle control unit 320 in accordance with aspects of the disclosure. As illustrated, the vehicle control unit 320 may include a processor 410 and memory 420. Memory 420 of vehicle control unit 320 may store information accessible by processor 410, including executable code 440 that may be executed by the processor 410. The memory also includes data 430 that may be retrieved, manipulated or stored by the processor. The memory may be of any type of tangible media capable of storing information accessible by the processor, such as a hard-drive, memory card, ROM, RAM, DVD, CD-ROM, write-capable, and read-only memories. The processor 410 may be any well-known processor, such as commercially available processors. Alternatively, the processor may be a dedicated controller such as an ASIC.

Data 430 may be retrieved, stored or modified by processor 410 in accordance with the executable code 440. For instance, although the system and method are not limited by any particular data structure, the data may be stored in computer registers, in a relational database as a table having a plurality of different fields and records, or XML documents. The data may also be formatted in any computer-readable format such as, but not limited to, binary values, ASCII or Unicode. Moreover, the data may comprise any information sufficient to identify the relevant information, such as numbers, descriptive text, proprietary codes, pointers, references to data stored in other memories (including other network locations) or information that is used by a function to calculate the relevant data.

Templates 432 may include representations of characteristics of known emergency vehicles. In one example, the template 432 may indicate one or more characteristics, such as size, color, or shape, of a known type of emergency vehicle. For example, the template may include an image of the known emergency vehicle, a histogram of the image, a set of values that describe a given property of an image of the known emergency vehicle (e.g., eigenvector), a 3D model of the known emergency vehicle's shape generated by using a laser scanner, or a set of vertices that describe the shape or part of the shape of the known emergency vehicle. As another example, the template may indicate a characteristic of color or intensity of light produced by the known-emergency vehicle's strobe lights. As yet another example, the template 432 may indicate the sound made the known emergency vehicle. (e.g., indicate the sound made by an emergency vehicle's siren, engine, or another vehicle component.)

Trajectory(ies) 434 may include one or more data structures representing one or more trajectories of vehicles, such as the vehicles 220 and 230 that are monitored by the vehicle 101. The data structures may be files, arrays, or any other type of data structure. In one example, a trajectory is stored as a set of location samples. Each sample may be taken at a different time instant. Each sampled location may be represented by an X-coordinate and Y-Coordinate.

Figure 5:
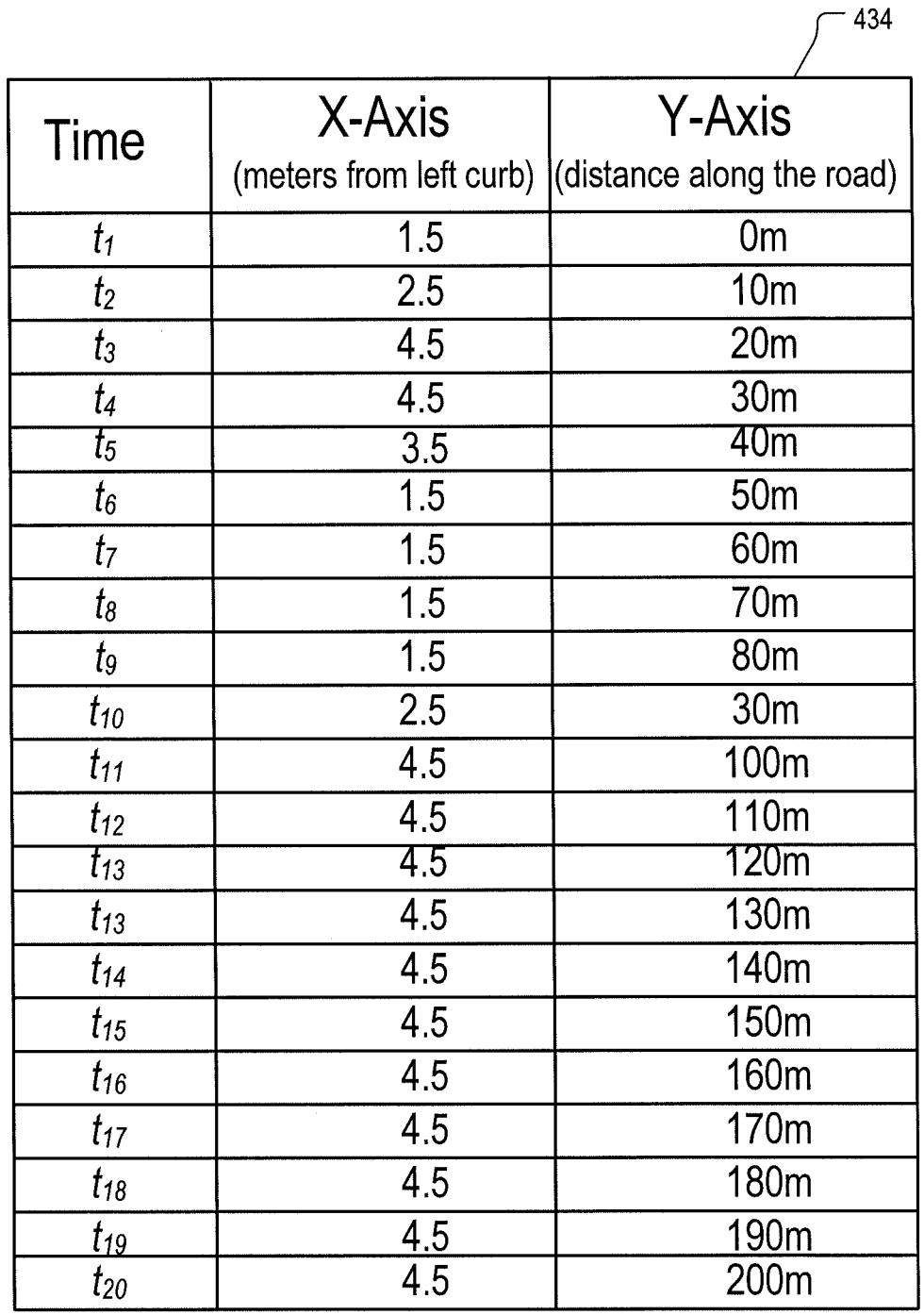
FIG. 5 depicts a tabular representation of the of a vehicle that shares the road with the controlled vehicle of FIG. 1.

FIG. 5 depicts an example of a data structure 500 representing the trajectory 222 of FIG. 2B. In this example, the time instants are designated t1, t2, t3, etc. For example, time instant t1, the sampled location is 1.5 m along the X-axis and 0 m along the Y-axis. In the example of FIG. 5, the coordinate system is defined by a Y-axis running in parallel to the left curb of road (200) and the X-axis is normal to the Y-axis.

The data structure 500 provides only an example of how vehicle trajectories (e.g., observed or generated) may be represented. In further examples, however, each of the vehicle trajectories may be represented as a set of vectors, collection of coordinates, a polynomial, or any other representation. The trajectories may be part of course estimates, road models, and other similar structures used by the vehicle control unit 320 in controlling the operation of the controlled vehicle 101. Furthermore, although in this example locations of trajectory 222 are represented as coordinate pairs, in other examples they may be represented as vectors, polynomials, or any other form capable of identifying a location in the environment of controlled vehicle 101. The present disclosure is not limited to any specific type of location representations.

Figure 6:
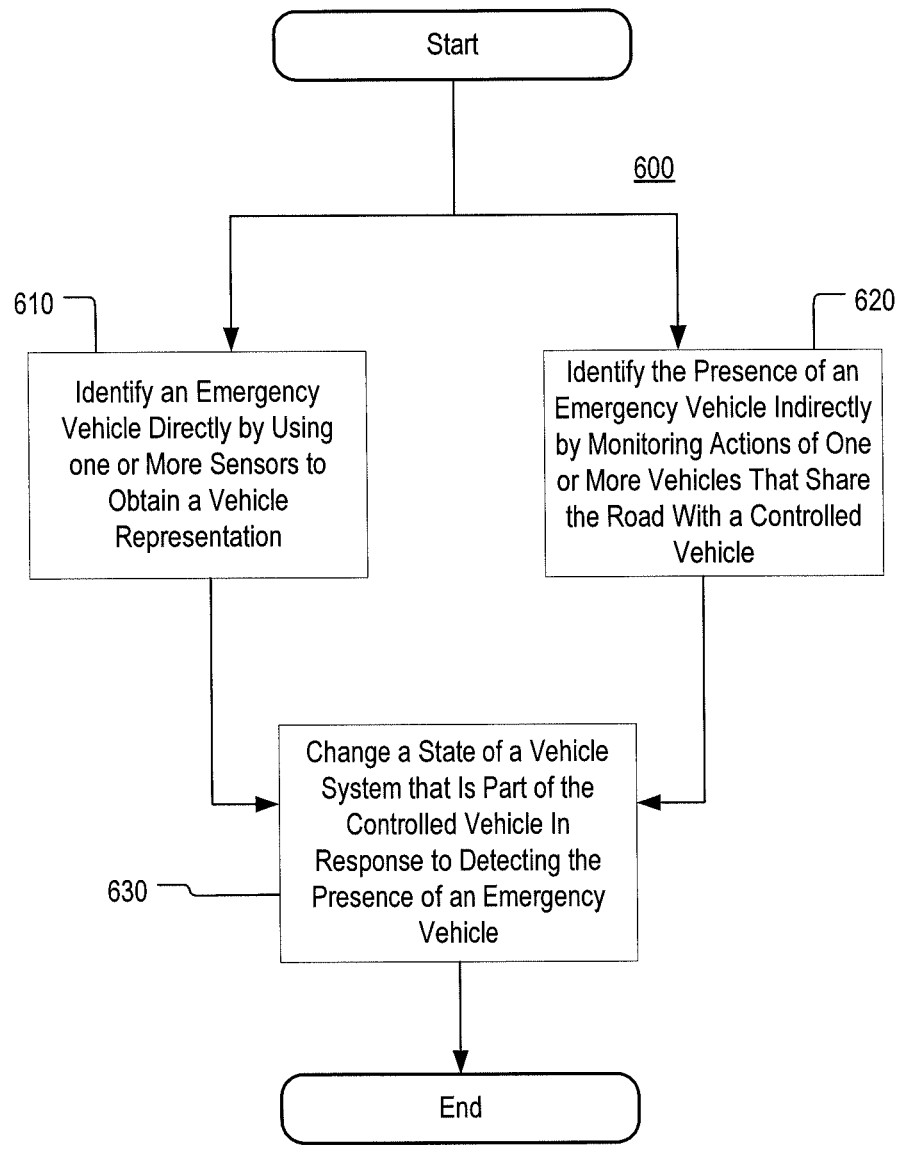
FIG. 6 depicts a flowchart of a process associated with the operation of the controlled vehicle of FIG. 1.

FIG. 6 depicts a flowchart of an example process 600 in accordance with one aspect of the disclosure. In this example, at task 610, a vehicle sharing the road 200 with the controlled vehicle 101 is detected as an emergency vehicle by the vehicle control unit 320. The vehicle 210 may be detected using a laser scanner, radar, camera, or any other sensor typically used by autonomous (or semi-autonomous vehicles) to detect other vehicles in their surroundings.

Once the vehicle 210 is detected, a determination is made whether the vehicle 210 is an emergency vehicle. In one example, input from one or more of the sensors 330 may be received by the vehicle control unit 320 and a template of the vehicle 210 may be generated based on the received sensor input. The generated template of the vehicle 210 may be of the same type as the template 432, such as a 3D template generated based on a signal from a laser scanner. The generated template may then be compared, using standard pattern recognition techniques, to one or more templates of known emergency vehicles, such as the template 432. If the template of the vehicle 210 matches one or more of the templates of known emergency vehicles, the vehicle 210 may be identified as an emergency vehicle.

At task 620, the vehicle control unit 320 detects the presence of an emergency vehicle in the vicinity of the controlled vehicle 101 based on the behavior of one or more vehicles that share the road 200 with the vehicle 101. Task 620 is discussed further with respect to FIGS. 7-9.

At task 630, the vehicle control unit 320 changes the state of the vehicle 101 in response to the detection of an emergency vehicle at either one of tasks 610 and 620. Changing the state of the vehicle 101 may include changing the state of any one the vehicle systems 310a-f. For example, changing the state may include turning down the stereo, turning on headlights, turning on emergency lights, or another similar action.

Alternatively or in addition to the aforementioned example changes, changing the state of the vehicle may include changing at least one of the speed and direction of the vehicle 101. For example, upon the detection of the emergency vehicle, the vehicle control unit 320 may cause the vehicle 101 to pull over to the side of the road, change lanes, slow down, or perform another action that is customarily performed by drivers when they encounter emergency road situations.

Figure 7:
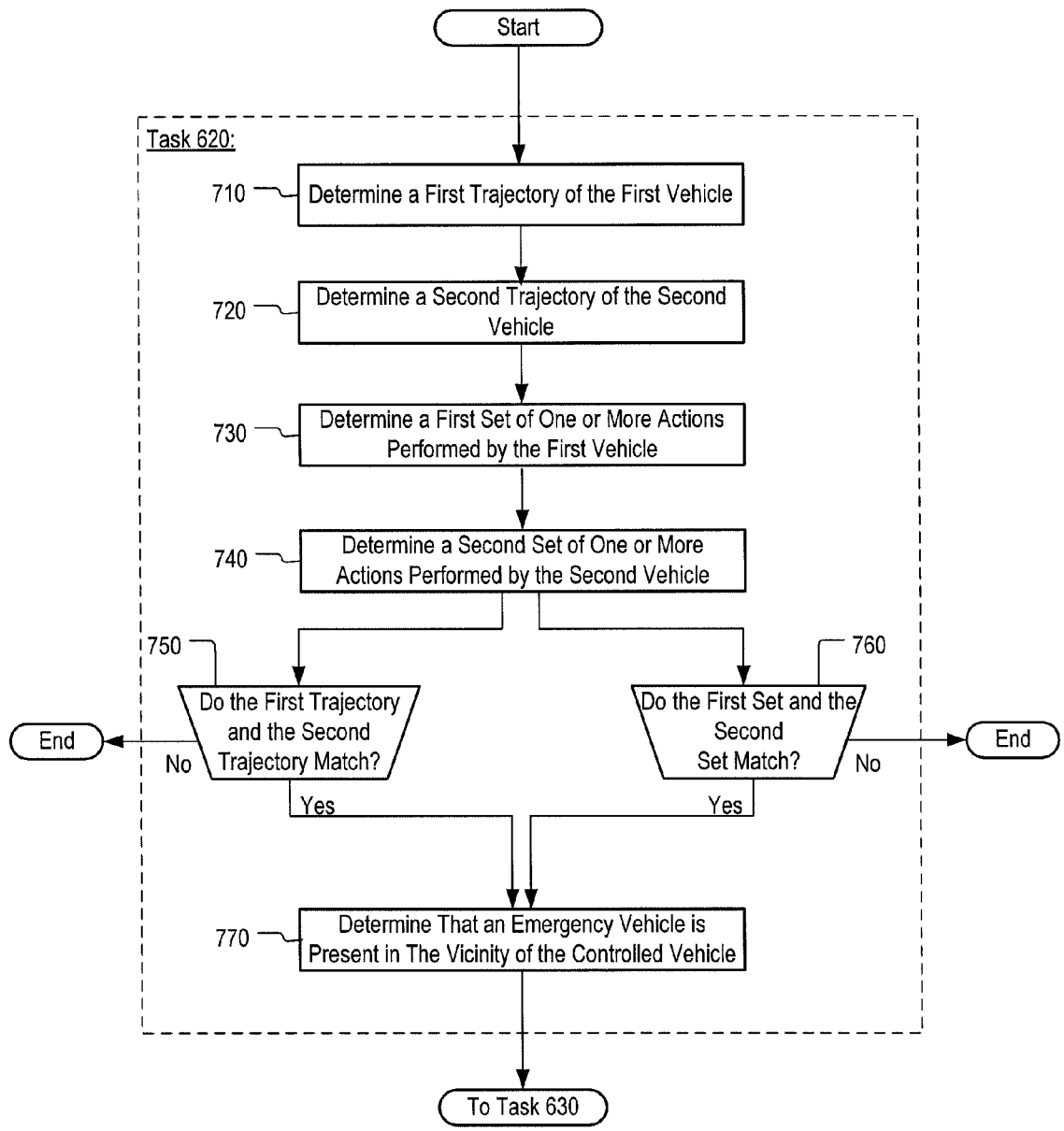
FIG. 7 depicts a flowchart of a process associated with FIG. 6.

FIG. 7 depicts a flowchart of an example process 700 that may be associated with task 620 of FIG. 6 or detecting the presence of an emergency vehicle based on the behavior of other vehicles that share the road 200 with the controlled vehicle 101. At task 710, the vehicle control unit 320 monitors the operation of the vehicle 220 and determines the trajectory 222 of the vehicle 220. At task 720, the vehicle control unit monitors the operation of the vehicle 230 and determines the trajectory 232 of the vehicle 230.

At task 730, a first set of one or more actions performed by the vehicle 220 is determined. The actions may include, accelerating the vehicle 220, changing lanes, decelerating the vehicle 220, stopping, or pulling over in a road's shoulder, activating a blinker, or sounding a horn. In one aspect, the determined first set may further indicate the order in which the actions in the set have been performed by the vehicle 220. In another aspect, the determined first set may identify a time when each one of the actions in the set was performed by the vehicle 220. In one aspect, the actions may be determined based on the trajectories determined at task 230. In another aspect, the actions may be determined using a camera in combination with standard image recognition techniques. In another example, the actions may be determined using a microphone in combination with standard image recognition techniques.

At task 740, a second set of one or more actions performed by the vehicle 230 is determined. The second set may also indicate the order in which actions have been performed by the vehicle 230. Furthermore, the second set may indicate a time when each one of the actions in the second set was performed by the vehicle 230. The second set may be determined in the same manner as discussed with respect to the first set.

At task 750, a determination is made whether the first trajectory and the second trajectory match. If they are determined to match, a determination is made at task 770 that an emergency vehicle is located in the vicinity of the controlled vehicle 101. If they are found not to match, the execution of the process 700 is terminated. Task 750 is described in further detail with respect to FIG. 8 below.

At task 760, a determination is made whether the first set of actions matches the second set. If they are determined to match, a determination is made at task 770 that an emergency vehicle is located in the vicinity of the controlled vehicle 101. If they are found not to match, the execution of the process 700 is terminated. In some instances, only one of tasks 750 and 760 may be performed when the process 700 is executed.

Figure 8:
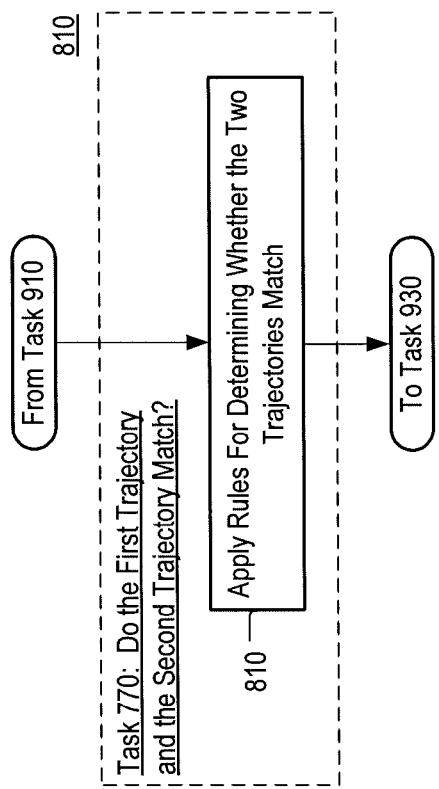
FIG. 8 depicts a flowchart of another process associated with FIG. 6.

FIG. 8 depicts a flowchart of an example process 800 associated with task 750 of FIG. 7 or determining whether two trajectories, such as the trajectory 222 and the trajectory 232, match. At task 810, a rule for determining whether the trajectories match is applied. In one aspect, the rule may provide that two trajectories match if they have the same or similar shape. For example, two trajectories may be deemed to have the same or similar shape if they include the same sequence of lane changes (e.g., lane 1→lane 2, lane 2→lane 3, lane 3→lane 1). As another example, two trajectories may be deemed to have the same or similar shape if they include the same sequence of lane changes spaced at the same or similar distance (e.g., lane 1→lane 2, lane 2→lane 3 (taking place 50 meters after previous lane change), lane 3→lane 1 (taking place 100 meters after preceding lane change).

In another aspect, the rule may provide that the two trajectories match if every lane change in a first trajectory, such as trajectory 222, takes place within a predetermined distance from a corresponding lane change in a second trajectory, such as trajectory 232. As discussed with respect to FIG. 2B, the lane change in the trajectory 222 takes place within 80 meters from the lane change in the trajectory 232. If that distance is less than a predetermined threshold distance, the two trajectories may be found to match by the rule. As noted above, threshold may be calculated dynamically by the vehicle control unit 320 based on the distance between the vehicles 220 and 230.

In yet another aspect, a rule may provide that two trajectories match if they identify the same type of action. For instance, the trajectories of two vehicles, such as vehicles 220 and 230 of FIG. 2A, may be considered to match if they indicate that both the vehicles 220 and 230 have pulled in the shoulder of the road 200. In yet another aspect, the rule may provide that the trajectories of two vehicles match if they indicate that both of the corresponding vehicles performed the same type of action (e.g. lane change) within a predetermined time interval. Similarly, in yet another aspect, two trajectories may be considered to match if they indicate that both of the corresponding vehicles have left the same lane within a predetermined time period.

As discussed above, the performance of the same action by many vehicles within a short time period may indicate the presence of a common cause that prompted all the vehicles to perform the same action. As noted above, this common cause may be determined by vehicle 101 to be the approach of an emergency vehicle.

Figure 9:
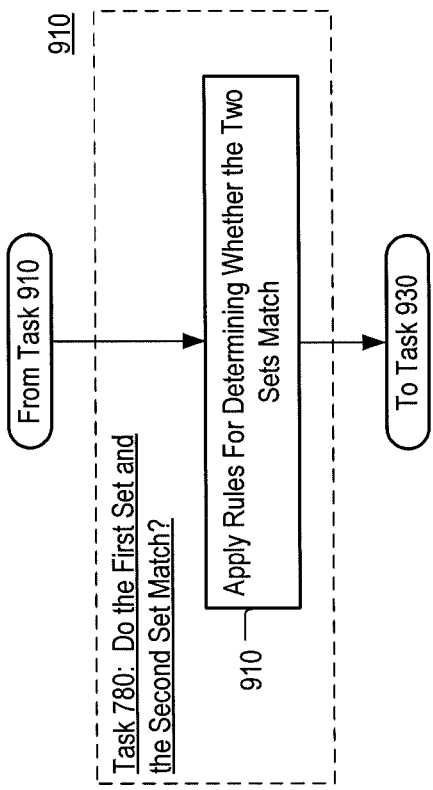
FIG. 9 depicts a flowchart of yet another process associated with FIG. 6.

FIG. 9 depicts a flowchart of an example process 900 that may be associated with task 760 of FIG. 7 or determining whether the first set of one or more actions performed by a first vehicle matches the second set of one or more actions performed by a second vehicle. At task 910, a rule is applied to determine whether the two action sets match. In one aspect, the rule may provide that the two sets match if they include the same type of action (e.g., pulling in a road's shoulder). In another aspect, the rule may provide that the two sets match if they include the same type of action (e.g., changing lanes), wherein both actions are performed in a predetermined temporal proximity (e.g., during a time interval of predetermined duration).

In another aspect, a rule may provide that the first set of one or more actions performed by a first vehicle may match the second set of one or more actions performed by a second vehicle if both sets include the same relative sequence of actions. For example, according to this rule, if both sets include a first type of action (e.g. decelerate), followed by a second type of action (lane change), followed by a third type of action (switch on headlights), performed in that sequence, the two sets may be determined by vehicle 101 to match. The presence of intervening actions between the first, second, and third type of actions may not affect the application of the rule because the rule concerns the actions' relative sequence.

In yet another aspect, a rule may provide that the first set of one or more actions performed by a first vehicle may match the second set of one or more actions performed by a second vehicle if both sets indicate that a particular type of action is performed in a sequence that corresponds to a distance between the first and second vehicles. For example, the rule may provide that the two (or three) sets match, if a given action is performed first by the vehicle that is the furthest away from the controlled vehicle 101, and then by another vehicle that is closer to the controlled vehicle 101, and by another vehicle that is even closer to the vehicle 101. This rule may be used to recognize emergency vehicles based on the ripple the emergency vehicles might create in traffic as other vehicles on the road move away from the vehicles' way in the order in which they are reached.

FIGS. 6-9 are provided as examples only. At least some of the tasks may be performed in a different order than represented, performed concurrently, or altogether omitted. Although in the above examples the trajectories (or actions) of only two vehicles (such as vehicles 220 and 230) are used to detect an emergency vehicle, in other examples a greater number of vehicles may be considered. It should be understood that some or all of the tasks depicted in FIGS. 6-9 may be performed by the processor 410 of the vehicle control unit 320 or the processor of another processor-based device.

As these and other variations and combinations of the features discussed above can be utilized without departing from the subject matter as defined by the claims, the foregoing description of exemplary aspects should be taken by way of illustration rather than by way of limitation of the subject matter as defined by the claims. It will also be understood that the provision of the examples described herein (as well as clauses phrased as "such as," "e.g.", "including" and the like) should not be interpreted as limiting the claimed subject matter to the specific examples; rather, the examples are intended to illustrate only some of many possible aspects.

The invention claimed is:

1. A method comprising:
receiving, by one or more processors, sensor data corresponding to objects on a roadway in a vehicle's environment;
identifying, by the one or more processors, a set of objects corresponding to one or more other vehicles from the sensor data;
determining, by the one or more processors, from the sensor data that each object of the set of objects pulled out of a lane and slowed down;
based on the determination that each object of the set of objects pulled out of a lane and slowed down, determining, by the one or more processors, that an emergency vehicle is present on the roadway.

2. The method of claim 1, further comprising:
determining that each object of the set of pulled out of a same lane, and
wherein determining that an emergency vehicle is present on the roadway is further based on the determination that each object of the set of pulled out of the same lane.

3. The method of claim 2, further comprising:
determining that each object of the set of pulled out of the same lane and onto a shoulder of the roadway, and
wherein determining that an emergency vehicle is present on the roadway is further based on the determination that each object of the set of pulled out of the same lane and onto the shoulder of the roadway.

4. The method of claim 2, further comprising:
determining that each object of the set of pulled out of the same lane and onto a different lane of the roadway from the same lane, and
wherein determining that an emergency vehicle is present on the roadway is further based on the determination that each object of the set of pulled out of the same lane and onto the different lane of the roadway.

5. The method of claim 2, wherein the vehicle is also in the same lane.

6. The method of claim 2, wherein the vehicle is in a different lane from the same lane.

7. The method of claim 2, further comprising:
determining that each object of the set of objects pulled out of the same lane within a given period of time, and
wherein determining that an emergency vehicle is present on the roadway is further based on the determination that each object of the set of objects pulled out of the same lane within the given period of time.

8. The method of claim 7, further comprising determining the given period of time based on a distance between two objects of the set of objects.

9. The method of claim 1, wherein the objects in the set of objects a in an order including a first object behind a second object in the same lane, and the method further comprises:
determining that the first object has pulled out of the same lane before the second object has pulled out of the same lane, and
wherein determining that an emergency vehicle is present on the roadway is further based on the determination that the first object has pulled out of the same lane before the second object has pulled out of the same lane.

10. The method of claim 1, wherein the set of objects includes at least two objects.

11. A system comprising one or more processors configured to:
receive sensor data corresponding to objects on a roadway in a vehicle's environment;
identify a set of objects corresponding to one or more other vehicles from the sensor data;
determine from the sensor data that each object of the set of objects pulled out of a lane and slowed down;
based on the determination that each object of the set of objects pulled out of a lane and slowed down, determine that an emergency vehicle is present on the roadway.

12. The system of claim 11, wherein the one or more processors are further configured to:
determine that each object of the set of pulled out of a same lane, and
wherein determining that an emergency vehicle is present on the roadway is further based on the determination that each object of the set of pulled out of the same lane.

13. The system of claim 12, wherein the one or more processors are further configured to:

determine that each object of the set of pulled out of the same lane and onto a shoulder of the roadway, and wherein determining that an emergency vehicle is present on the roadway is further based on the determination that each object of the set of pulled out of the same lane and onto the shoulder of the roadway.

14. The system of claim 12, wherein the one or more processors are further configured to:

determine that each object of the set of pulled out of the same lane and onto a different lane of the roadway from the same lane, and wherein determining that an emergency vehicle is present on the roadway is further based on the determination that each object of the set of pulled out of the same lane and onto the different lane of the roadway.

15. The system of claim 12, further comprising the vehicle and wherein the vehicle is also in the same lane.

16. The system of claim 12, further comprising the vehicle and wherein the vehicle is in a different lane from the same lane.

17. The system of claim 12, wherein the objects in the set of objects a in an order including a first object behind a second object in the same lane, and the one or more processors are further configured to:

determine that the first object has pulled out of the same lane before the second object has pulled out of the same lane, and wherein determining that an emergency vehicle is present on the roadway is further based on the determination that the first object has pulled out of the same lane before the second object has pulled out of the same lane.

18. The system of claim 12, wherein the one or more processors are further configured to:

determine that each object of the set of objects pulled out of the same lane within a given period of time, and wherein determining that an emergency vehicle is present on the roadway is further based on the determination that each object of the set of objects pulled out of the same lane within the given period of time.

19. The system of claim 18, further comprising determining the given period of time based on a distance between two objects of the set of objects.

20. A non-transitory, tangible computer-readable medium on which instructions are stored, the instructions when executed by one or more processors cause the one or more processors to perform a method, the method comprising:

receiving sensor data corresponding to objects on a roadway in a vehicle's environment;

identifying a set of objects corresponding to one or more other vehicles from the sensor data;

determining from the sensor data that each object of the set of objects pulled out of a lane and slowed down;

based on the determination that each object of the set of objects pulled out of a lane and slowed down, determining that an emergency vehicle is present on the roadway.

\* \* \* \* \*